US012697794B2

(12) United States Patent
Lescur

(10) Patent No.: US 12,697,794 B2
(45) Date of Patent: Aug. 4, 2026

(54) TIRE CURING MOLD HAVING A SEALING ELEMENT

(71) Applicant: COMPAGNIE GENERALE DES ETABLISSEMENTS MICHELIN, Clermont-Ferrand (FR)

(72) Inventor: Thomas Lescur, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 466 days.

(21) Appl. No.: 18/021,848

(22) PCT Filed: Aug. 16, 2021

(86) PCT No.: PCT/FR2021/051467
§ 371 (c)(1),
(2) Date: Feb. 17, 2023

(87) PCT Pub. No.: WO2022/038327
PCT Pub. Date: Feb. 24, 2022

(65) Prior Publication Data
US 2023/0391033 A1      Dec. 7, 2023

(30) Foreign Application Priority Data

Aug. 19, 2020      (FR) ...................................... 2008561

(51) Int. Cl.
*B29D 30/06* (2006.01)
*B29C 33/00* (2006.01)
*B29C 43/38* (2006.01)

(52) U.S. Cl.
CPC ...... *B29D 30/0606* (2013.01); *B29C 33/0038* (2013.01); *B29C 43/38* (2013.01);
(Continued)

(58) Field of Classification Search
CPC ........................ B29D 30/0609; B29D 30/0629
See application file for complete search history.

(56) References Cited

U.S. PATENT DOCUMENTS 5,269,669 A      12/1993  Ladouce
5,723,155 A  *    3/1998  Hayakawa .............. B29C 43/42
                                                         425/395

(Continued)

FOREIGN PATENT DOCUMENTS

EP          0522374 A1      1/1993
EP          3115167 A1      1/2017
(Continued)

OTHER PUBLICATIONS

Isoi. JP2003039435A. 2003. ESpaceNet Machine Translation. (Year: 2025).*

(Continued)

*Primary Examiner* — Sedef E Paquette
*Assistant Examiner* — Alexander D Booth
(74) *Attorney, Agent, or Firm* — VENABLE LLP

(57) ABSTRACT
A tire curing mold (20) comprises two shells (21) that are each intended to mold a sidewall of the tire and a ring of sectors (22) that are intended to mold a tread of the tire, each sector (22) having a lining (23) and two arc-shaped segments (27). Each segment (27) is arranged so as to fill a clearance at an interface between the lining (23) and a shell (21), and so as to not be coincident with a molding surface (24) of the curing mold.

11 Claims, 2 Drawing Sheets

(52) U.S. Cl.
CPC .. *B29D 2030/0609* (2013.01); *B29K 2905/02* (2013.01); *B29K 2905/12* (2013.01)

(56) References Cited

U.S. PATENT DOCUMENTS

| | | | |
|---|---|---|---|
| 9,623,616 B2 | 4/2017 | Villeneuve et al. | |
| 9,731,463 B2 | 8/2017 | Kohara | |
| 2007/0145634 A1* | 6/2007 | Rawlings | B29C 33/0038 |
| | | | 425/542 |
| 2007/0148270 A1* | 6/2007 | Jung | B29D 30/0629 |
| | | | 425/54 |
| 2009/0120561 A1 | 5/2009 | Yasunaga | |
| 2016/0193797 A1 | 7/2016 | Villeneuve et al. | |
| 2017/0057188 A1 | 3/2017 | Kohara | |
| 2019/0009434 A1* | 1/2019 | Blanchet | B29D 30/0629 |
| 2022/0274362 A1 | 9/2022 | Bardin et al. | |
| 2023/0166468 A1 | 6/2023 | Bardin et al. | |
| 2023/0347608 A1 | 11/2023 | Bardin et al. | |

FOREIGN PATENT DOCUMENTS

| | | |
|---|---|---|
| EP | 3590695 A1 | 1/2020 |
| FR | 1453942 | 8/1966 |
| FR | 3009230 A1 | 2/2015 |
| JP | 2003-39435 A | 2/2003 |
| KR | 10-2016-0046006 A | 4/2016 |

OTHER PUBLICATIONS

Wikipedia. "Aluminum" <https://web.archive.org/web/20190601163059/https://en.wikipedia.org/wiki/Aluminium>. Accessed Dec. 5, 2025. (Year: 2019).*
International Search Report dated Dec. 1, 2021, in corresponding PCT/FR2021/051467 (6 pages).

* cited by examiner

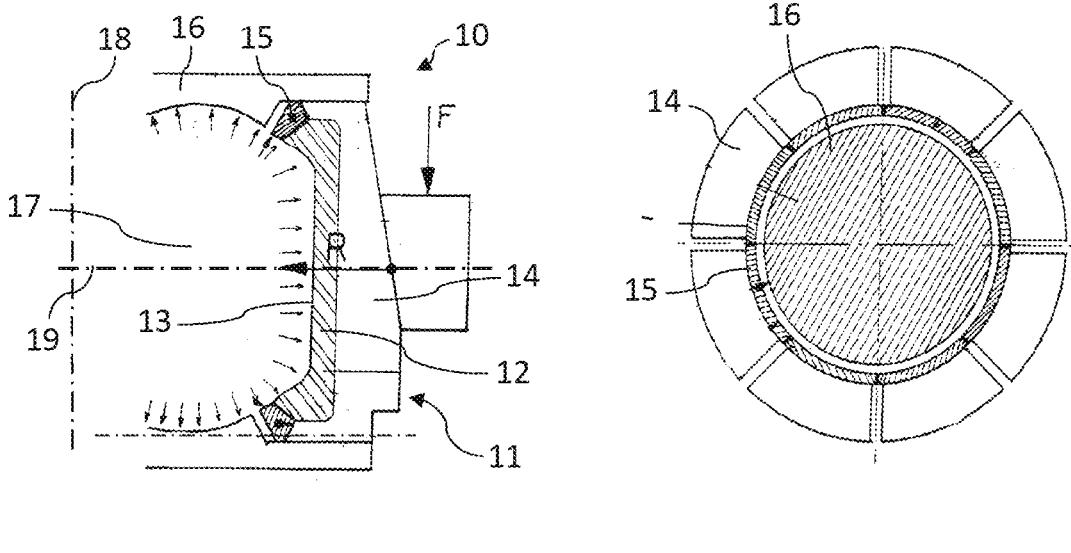
Fig. 1                  Fig. 2
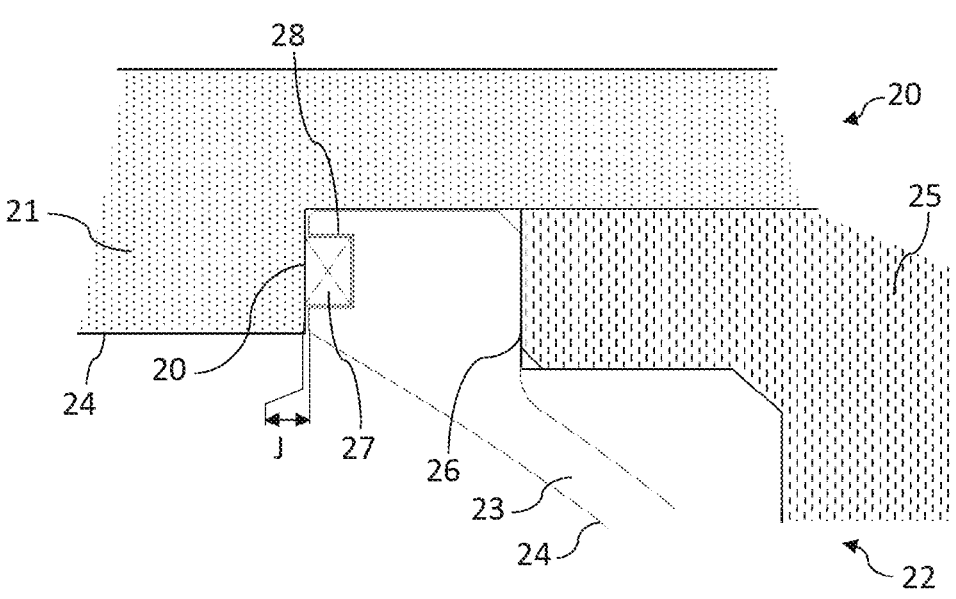
Fig. 3

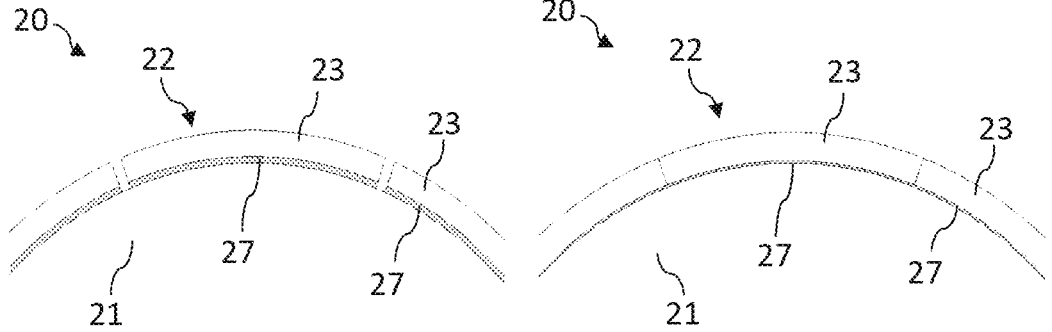
Fig. 4                    Fig. 5

TIRE CURING MOLD HAVING A SEALING ELEMENT

BACKGROUND

The invention lies in the field of tyre manufacturing, and relates more particularly to a tyre curing mould of the sectored type.

The manufacture of a tyre comprises a curing step during which a green tyre is vulcanized and moulded in order to obtain a tyre having desired mechanical characteristics, geometry and appearance. The curing is effected in a tyre curing mould comprising moulding elements. The moulding elements together form an internal moulding surface corresponding to the negative of the desired external surface of the tyre.

During the curing step, the green tyre is pressurized against the internal surface of the mould, and brought to temperature. The temperature conditions to which the raw rubber of the green tyre is subjected give rise to a significant reduction in its viscosity, which, together with the pressure conditions, promotes the formation of rubber flash between the moulding elements. In order to avoid the formation of flash, the clearance, or, in other words, the spacing, between the moulding elements has to be less than 0.03 mm.

In a known manner, the moulding elements of a mould of the sectored type comprise sectors that are intended to mould the tread of a tyre and two shells that are intended to mould the sidewalls of the tyre. The sectors are arranged circumferentially so as to form a ring, and the two shells are arranged axially on either side of the ring in the manner of covers. Each moulding element is in contact with a plurality of others. Furthermore, the mould is subjected to considerable temperature differences which tend to expand the moulding elements to a significant extent. Under these conditions, the closure of the mould with a clearance between the moulding elements of less than 0.03 mm is difficult to achieve without very precise production of said moulding elements, this being expensive.

Application EP0522374, in the name of the applicants, proposes a mould 10 of the sectored type, illustrated in FIGS. 1 and 2. A sector 11 has a lining 12 which forms part of the internal moulding surface 13 of the curing mould, and a support 14 to which the lining is fastened. Moreover, a sector comprises two ring segments 15 made of steel that are arranged laterally on said support such that, in a closed position of the mould, the ring segments are situated at the two interfaces of the lining with the shells 16. In the closed position of the mould, the ring segments 15 are in circumferential contact in a pairwise manner, and a radial pressure towards the inside of the mould is exerted on them, in such a way that the ring segments 15 are compressed elastically until the linings 12 in turn come to be in circumferential contact in a pairwise manner. Consequently, the linings 12 made of aluminium are also compressed elastically and/or plastically. The circumferential compression of the assembly formed by the ring segments 15 and the lining elements 12 tends to reduce the diameter of said assembly which then comes into radial contact with the shells. Thus, by virtue of the elastic and/or plastic deformation of the ring segments and of the linings, the closure of the mould with a clearance between the moulding elements of less than 0.03 mm is possible.

Nevertheless, the ring segments are precision parts which require a quality grade of steel having good elastic properties. Their arrangement with respect to the other parts of the mould requires a number of adaptations which render the design of the mould complex. Lastly, the assembly of the mould requires a precision fit. The curing mould thus produced, adapted and assembled is, consequently, very expensive.

Furthermore, the segments are coincident with the internal moulding surface. In other words, said segments have a moulding surface which forms part of the internal moulding surface of the mould. It is therefore very constraining, or even impossible, to produce or insert engravings on that part of the internal moulding surface which is formed by the ring segments, said engravings being intended to form markings on the shoulder of the tyre.

It is an objective of the invention to overcome the drawbacks of the prior art and to provide a solution that avoids the formation of rubber flash.

SUMMARY

To that end, a first subject of the invention is a tyre curing mould comprising two shells that are each intended to mould a sidewall of the tyre and a ring of sectors that are intended to mould a tread of the tyre, each sector having a lining and two arc-shaped segments, characterized in that each segment is arranged so as to fill a clearance at an interface between the lining and a shell, and so as to not be coincident with a moulding surface of the curing mould.

Thus, the clearance at an interface between the lining and a shell is filled by the segment, or, in other words, said clearance is zero or less than 0.03 mm. The formation of rubber flash is thus avoided. Furthermore, since the segment is not coincident with the moulding surface, it is easy to produce or insert engravings that are intended to form markings on the shoulder of the tyre.

Advantageously, said segment is housed in a recessed groove on said contact surface. Such a design is simple and inexpensive with respect to the design of the prior art.

Preferably, in the closed position of the mould,
the lining is in contact with a shell only via said segment,
the sectors are in circumferential contact in a pairwise manner via said linings.

In other words, in the closed position of the mould, the segment is in radial contact with a shell, and a radial pressure is exerted on said segment in such a way that the segment is compressed elastically and/or plastically until the lining comes into circumferential contact with the adjacent linings. Thus, by virtue of the elastic and/or plastic deformation of the segments, the mould is closed with a clearance between the moulding elements of zero or less than 0.03 mm.

According to one embodiment variant, in the closed position of the mould,
the lining is in contact with a shell via said segment and via the contact surface of the lining at the interface between the lining and a shell,
the sectors are in circumferential contact in a pairwise manner via said linings.

Thus, in the closed position of the mould, the segment is in radial contact with a shell, and a radial pressure is exerted on said segment in such a way that the segment is compressed elastically and/or plastically until the lining comes into circumferential contact with the adjacent linings, and until the lining comes into contact with a shell by said surface by way of said contact surface. Thus, by virtue of the elastic and/or plastic deformation of the segments, the mould is closed with a clearance between the moulding elements of zero or less than 0.03 mm.

Preferably, said segment is spaced apart from said moulding surface and, more preferably, spaced apart from said moulding surface by 0.1 mm to 10 mm. Thus, the moulding surface of the lining is not weakened by too great a proximity to the groove and the segment. Furthermore, by compressing radially, the segment widens axially and can lie flush with or go beyond the moulding surface. A sufficient distance is then required between said moulding surface and the segment. Conversely, an excessive distance associated with insufficient radial compression of the segment in the closed position of the mould increases the risk of flash forming. It is therefore necessary to limit said distance. In conclusion, such a design makes it possible to improve the quality of moulding of a tyre.

Advantageously, the material of the lining has an admissible contact pressure, referred to as brinelling pressure, greater than or equal to 350 MPa and, preferably, greater than 400 MPa. Thus, the contact surfaces between the linings have a good resistance to wear and to brinelling. The service life of the mould is thus improved. Preferably, the material of a lining is selected from a group of materials comprising ferrous alloys such as steel.

Preferably, the lining is obtained by way of a process of consolidation by selective melting.

Advantageously, the material of said segment has an admissible contact pressure, referred to as brinelling pressure, lower than 350 MPa and, preferably, lower than 300 MPa. Thus, the segment can be locally deformed more easily, or even squashed, so as to allow airtight contact between the shell and the lining. Preferably, the material of a segment is selected from a group of materials comprising aluminium alloys.

A second subject of the invention is a method for manufacturing a tyre, comprising a step of curing a tyre in a mould according to the first subject of the invention.

Lastly, a subject of the invention is a tyre intended to be mounted on the rim of a wheel, characterized in that it is obtained by a manufacturing method according to the second subject of the invention.

BRIEF DESCRIPTION OF THE FIGURES

The invention will be understood better from the rest of the description, which is based on the following figures:

FIG. 1, already described, is a view in radial section of a curing mould according to the prior art;

FIG. 2, already described, is a view in axial section of the mould in FIG. 1;

FIG. 3 is a view in radial section of certain elements of a curing mould according to the invention;

FIG. 4 is a view in axial section of certain elements of the mould in FIG. 3 in an intermediate position of said mould between an open position and the closed position;

FIG. 5 is a view in axial section of certain elements of the mould in FIG. 3 in the closed position of said mould.

DETAILED DESCRIPTION

In the various figures, elements that are identical or similar bear the same reference. Their description is therefore not systematically repeated.

FIGS. 1 and 2 schematically illustrate a tyre curing mould 10 known from the prior art. The mould delimits a cavity 17 that is generally rotationally symmetric about a central axis 18.

Throughout the following text and unless indicated to the contrary, an axial direction denotes a direction parallel to the central axis 18, a radial direction 19 denotes a direction perpendicular to and intersecting the central axis 18, and a circumferential direction denotes a direction perpendicular to a radial direction 19 and to the central axis 18.

FIG. 3 is a partial view in radial section of a tyre curing mould 20 according to the invention, in the closed position. The curing mould comprises two shells 21 that are each intended to mould a sidewall of the tyre and a ring of sectors 22 that are intended to mould a tread of the tyre. Each sector 22 has a lining 23 that forms, together with the shells, an internal moulding surface 24, and a support 25. The lining 23 of a sector 22 is in one piece, or may also be composed of a plurality of lining elements. The lining 23 is arranged on and secured to the radially internal face 26 of the support 25 by any suitable means. The radially internal face 26 of the support generally takes the form of an axially extending cylinder. By way of example, said face may also have a frustoconical shape. The sectors 22 are in circumferential contact in a pairwise manner by way of their lateral faces, and the sectors 22 and the shells 21 are spaced apart by a clearance J.

According to one embodiment of the invention, the mould 20 comprises two arc-shaped segments 27. Each segment 27 is arranged so as to fill the clearance J at an interface between the lining 23 and a shell 21, and so as to not be coincident with the moulding surface 24 of the curing mould. All of the segments 27 that are situated, for example, at the upper interface between a shell 21 and the sectors 22 form an annular ring of small cross section compared with the cross sections of the adjacent elements. By way of example, the radially internal face of the shell 21, against which the segments 27 come to bear, generally takes the form of an axially extending cylinder.

A segment 27 is housed in a recessed groove 28 on a contact surface of the lining at the interface between the lining and a shell. The segment has a rectangular cross section (FIG. 3), but may, for example, have a circular or triangular cross section. The cross section of the groove is complementary to that of the segment so as to allow a good distribution of the contact pressures, and/or is extended axially to a substantially greater extent than that of the segment in order to allow said segment to be inserted in the groove and be squashed when the segment is compressed radially.

The segment 27 is spaced apart from the moulding surface 24 of the lining 23 and, more preferably, spaced apart from said moulding surface by 0.1 mm to 10 mm. Thus, said moulding surface is not weakened by too great a proximity to the groove 28 and the segment 27. Furthermore, by compressing radially, the segment 27 widens axially and can lie flush with or go beyond the moulding surface 24. A minimum distance is then required between said moulding surface and the segment. Conversely, an excessive distance associated with insufficient radial compression of the segment increases, in the closed position of the mould, the risk of flash forming. It is therefore necessary to limit said distance.

The material of the lining 23 has an admissible contact pressure, referred to as brinelling pressure, greater than or equal to 350 MPa and, preferably, greater than 400 MPa. Thus, the lateral faces of the linings 23 have a good resistance to wear and to brinelling. The material of the lining 23 is selected from a group of materials comprising ferrous alloys. By way of example, the lining is made of steel and, more particularly, of a steel adapted to a manufacturing process of consolidation by selective melting.

The material of the segment 27 has an admissible contact pressure, referred to as brinelling pressure, lower than 350 MPa and, preferably, lower than 300 MPa. Thus, the segment can be locally deformed more easily, or even squashed, so as to allow airtight contact between the shell 21 and the lining 23. The material of a segment 27 is selected from a group of materials comprising aluminium alloys.

FIG. 4 illustrates the mould 20 in an intermediate position between an open position and a closed position. The sectors 22 bear radially against a shell 21 via the lining 23 and never via the support 24, the lining 23 itself bearing radially against the shell 21 via the segment 27. The sectors 22 are close circumferentially but are still not in contact.

FIG. 5 illustrates the mould 20 in the fully closed position. In other words, the closure means of the mould exert, on the sectors 22, a radial clamping pressure from the outside to the inside of the mould, such that the segments 27 are radially compressed elastically and/or plastically until the sectors 22 come into circumferential contact in a pairwise manner by way of their lining 23.

According to a first embodiment variant, in the closed position of the mould, the lining 23 is in contact with a shell 21 only via said segment 27, the sectors 22 are in circumferential contact in a pairwise manner via said linings 23.

According to a second embodiment variant, in the closed position of the mould, the lining 23 is in contact with a shell 21 via said segment 27 and via the contact surface of the lining at the interface between the lining and a shell, the sectors are in circumferential contact in a pairwise manner via said linings.

The lining is obtained by way of a process of consolidation by selective melting. "Selective consolidation by melting" is understood to be an additive manufacturing process intended to aggregate or agglomerate a feed of incoming work material progressively and selectively so as to obtain an outgoing work material. The incoming work material takes the form of and/or is used in the composition of a powder, of a wire or of a solution/bath. The incoming work material is generally introduced by depositing a powder on a support so as to form a layer. The support takes the form of a plate or a previously agglomerated layer. The agglomeration is generally achieved by solidification of the incoming work material, which is melted completely or partially (sintering) by localized or generalized input of energy, and then cooled. The input of energy is generally realized by a laser or an electron beam, although it can be realized by infrared radiation or induction. In the case of the laser and the electron beam, the localization of the input of energy is achieved by means for orienting the input of energy, such as optical or electromagnetic means, respectively. The process provides the incoming work material with a shape and mechanical characteristics that are predetermined. Said shape and said characteristics depend on the material of the incoming work material and on parameters of the process. Said shape is generally a one-piece solid, although it can be made up of a plurality of one-piece solids.

The invention claimed is:

1. A tire curing mold comprising two shells that are each intended to mold a sidewall of a tire and a ring of sectors that are intended to mold a tread of the tire, each sector having a lining and two segments that are arc shaped, wherein each segment is arranged so as to fill a clearance at an interface between the lining and one of the two shells, and is arranged so that spacing between each segment and a molding surface of the tire curing mold is 0.1 mm to 10 mm so as to not be coincident with the molding surface of the tire curing mold, including not being coincident with the molding surface of the tire curing mold during vulcanization of the tire such that the tire curing mold is capable of forming markings on a shoulder of the tire.

2. The tire curing mold according to claim 1, wherein each segment is housed in a recessed groove on a contact surface of the lining at the interface between the lining and one of the two shells.

3. The tire curing mold according to claim 1, wherein, in a closed position of the mold, the lining is in contact with one of the two shells only via one of the segments, and the sectors are in circumferential contact in a pairwise manner via the lining.

4. The tire curing mold according to claim 1, wherein, in a closed position of the mold, the lining is in contact with one of the two shells via one of the segments and via a contact surface of the lining at the interface between the lining and one of the two shells, and the sectors are in circumferential contact in a pairwise manner via the lining.

5. The tire curing mold according to claim 1, wherein each segment is spaced apart from the molding surface.

6. The tire curing mold according to claim 1, wherein a material of the lining has an admissible contact pressure greater than or equal to 350 MPa.

7. The tire curing mold according to claim 1, wherein a material of the lining is selected from a group of materials comprising ferrous alloys.

8. The tire curing mold according to claim 1, wherein the lining is obtained by way of a process of consolidation by selective melting.

9. The tire curing mold according to claim 1, wherein a material of one of the segments has an admissible contact pressure lower than 350 MPa.

10. The tire curing mold according to claim 1, wherein a material of one of the segments is selected from a group of materials comprising aluminium alloys.

11. A method for manufacturing a tire comprising a step of curing a tire in the tire curing mold according to claim 1.

* * * * *